(12) United States Patent
Inoue

(10) Patent No.: US 6,201,716 B1
(45) Date of Patent: Mar. 13, 2001

(54) CONTROLLER OF POWER SUPPLYING APPARATUS WITH SHORT CIRCUIT PREVENTING MEANS

(75) Inventor: Naoki Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/080,962

(22) Filed: May 19, 1998

(30) Foreign Application Priority Data

Jan. 6, 1998 (JP) .................................................. 10-001100

(51) Int. Cl.[7] ............................. H02H 7/122; H02M 5/42
(52) U.S. Cl. ................................. 363/56; 363/58; 363/98
(58) Field of Search ................................. 363/55, 56, 58, 363/98, 132

(56) References Cited

U.S. PATENT DOCUMENTS

| 5,436,819 | * | 7/1995 | Mikami et al. | ........................ 363/41 |
| 5,694,010 | * | 12/1997 | Oomura et al. | ...................... 318/254 |
| 5,703,769 | | 12/1997 | Kanna et al. | .......................... 363/98 |
| 5,825,141 | * | 10/1998 | Matsui et al. | ........................ 318/254 |
| 5,942,876 | * | 8/1999 | Mackawa | .............................. 318/801 |
| 6,005,784 | * | 12/1999 | Ikeshita | .................................. 363/37 |

FOREIGN PATENT DOCUMENTS

| 1-99493 | 4/1989 | (JP) | ................................. H02P/7/29 |
| 6-38539 | 2/1994 | (JP) | ................................. H02M/7/48 |
| 8-331882 | 9/1996 | (JP) | ................................. H02P/6/02 |
| 96-36276 | 10/1996 | (KR) | ............................. H02P/5/408 |
| 97-703650 | 7/1997 | (KR) | ............................. H03K/19/09 |
| WO 96/32778 | 10/1996 | (WO) | ................................. H03K/5/00 |

\* cited by examiner

Primary Examiner—Peter S. Wong
Assistant Examiner—Bao Q. Vu
(74) Attorney, Agent, or Firm—Burns, Doane, Swecker & Mathis, LLP

(57) ABSTRACT

The controller of power supplying apparatus, upon outputting of a timing signal from a timer, brings a switching element, which is in the conductive state, into the non-conductive state and, in the meantime, brings a switching element, which is in the non-conductive state, into an intermittently conductive state until a NAND circuit stops outputting a short-circuit preventing signal and, thereafter, holds the switching element in the conductive state.

6 Claims, 9 Drawing Sheets

CONTROLLER OF POWER SUPPLYING APPARATUS WITH SHORT CIRCUIT PREVENTING MEANS

BACKGROUND OF THE INVENTION

1. Field of the Invention

The present invention relates to a controller for controlling switching elements of a power supplying apparatus for supplying power to a load such as a three-phase motor through the switching elements.

2. Description of the Prior Art

FIG. 7 shows a circuit diagram of the main circuit of a power supplying apparatus controlled by a prior art controller of power supplying apparatus. Referring to FIG. 7, reference numeral 1 denotes a three-phase motor as a load. Reference numeral 2 denotes a DC power source. Reference numeral 3 denotes the switching element on the positive-phase side of the U-phase circuit. Reference numeral 4 denotes the switching element on the negative-phase side of the U-phase circuit. Reference numeral 5 denotes the switching element on the positive-phase side of the V-phase circuit. Reference numeral 6 denotes the switching element on the negative-phase side of the V-phase circuit. Reference numeral 7 denotes the switching element on the positive-phase side of the W-phase circuit. Reference numeral 8 denotes the switching element on the negative-phase side of the W-phase circuit. The switching elements 3 to 8 are rendered conductive when the gate voltage is at an L level. Reference numeral 9 denotes an interface circuit responsive to control signals from a controller 10 for controlling the switching elements 3 to 8. Reference numeral 10 denotes the controller.

FIG. 8 is a block diagram showing structure of the controller 10. Referring to FIG. 8, reference numerals 11u, 11v, and 11w denote timers. The timer 11u, upon receipt of a control command for the switching elements 3 and 4 from a speed controlling circuit, not shown, starts counting time and, at the same time, outputs a signal at an H level. Thereafter, it, when the counted time reaches a preset period of time T1, outputs a signal at an L level. The timers 11v and 11w perform the same functions as the timer 11u does, except that the control object are switching elements 5 and 6 and switching elements 7 and 8, respectively. Reference numerals 12u, 12v, and 12w denote short-circuit preventing timers. The short-circuit preventing timers 12u, 12v, and 12w, when the signal levels of the signals outputted from the timers 11u, 11v, and 11w change, respectively, from H level to L level, output a pulse signal with a pulse width of T2 (T2 corresponds to the short-circuit preventing period of time). Reference numerals 13u, 13v, and 13w denote flip-flops. The flip-flops 13u, 13v, and 13w, when the signal level of the signal outputted from the timers 11u, 11v, and 11w, respectively, changes from H level to L level, invert the signal level of the signal outputted therefrom.

Further, reference numerals 14u, 14v, and 14w denote flip-flops. The flip-flops 14u, 14v, and 14w, when the signal level of the signal outputted from the short-circuit preventing timers 12u, 12v, and 12w, respectively, changes from H level to L level, output a signal having a different signal level from the signal level of the signal outputted from the Q terminal of the flip-flops 13u, 13v, and 13w. Reference numerals 15u, 15v, and 15w denote NAND circuits. To one input terminals of the NAND circuits 15u, 15v, and 15w, the signals outputted from the flip-flops 14u, 14v, and 14w are inputted, respectively, and to the other input terminals, the signals outputted from the Q terminals of the flip-flops 13u, 13v, and 13w are inputted, respectively. Reference numerals 16u, 16v, and 16w denote flip-flops. The flip-flops 16u, 16v, and 16w, when the signal level of the signal outputted from the short-circuit preventing timers 12u, 12v, and 12w changes from H level to L level, respectively, output a signal having a signal level different from the signal level of the signal outputted from the QB terminal of the flip-flops 13u, 13v, and 13w. Reference numerals 17u, 17v, and 17w denote NAND circuits. To one input terminals of the NAND circuits 17u, 17v, and 17w, the signals outputted from the flip-flops 16u, 16v, and 16w are inputted, respectively, and to the other input terminals, the signals outputted from the QB terminals of the flip-flops 13u, 13v, and 13w are inputted, respectively. Reference numerals 18u, 18v, and 18w denote terminals on the positive-phase side of the U-phase, V-phase, and W-phase, respectively. Reference numerals 19u, 19v, and 19w denote the terminals on the negative-phase side of the U-phase, V-phase, and W-phase, respectively.

Now, operations will be described. Since the operations of the V-phase and W-phase are the same as the operations of the U-phase, description will only be given on the operations of the U-phase and description on the operations of the V-phase and W-phase will be omitted.

First, when driving a three-phase motor 1, it is necessary to supply AC power to the three-phase motor 1. Especially when it is required to control the revolving speed of the three-phase motor 1 to change over a wide range, sometimes, a power supplying apparatus in which AC power is once converted to DC power and then the DC power is inverted to desired AC power and supplied to the three-phase motor 1 is used (in FIG. 7, the portion converting AC power to DC power is omitted).

In the use of such a power supplying apparatus for supplying power by once converting AC power to DC power and then converting the DC power back to AC power, it becomes possible to supply desired AC power to the three-phase motor 1 by suitably controlling the firing angles of the switching elements 3 to 8. However, when the switching element 3 on the positive-phase side and the switching element 4 on the negative-phase side of the U-phase are rendered conductive at the same time, for example, it short-circuits the DC power source 2 in a no-load condition and, hence, it sometimes occurs that a large current flows from the DC power source 2 to ground through the switching elements 3 and 4 and, thereby the switching elements 3, 4 and the like are damaged.

Therefore, in order to prevent the switching element 3 on the positive-phase side and the switching element 4 on the negative-phase side from becoming conductive at the same time, first, when the timer 11U receives a control command for the switching elements 3 and 4 from a speed control circuit, not shown, at the point of time A as shown in FIG. 9, it starts counting time and, at the same time, outputs a signal at an H level and, when the counted time reaches a preset period of time T1, it outputs a signal at an L level (in the example of FIG. 9, the counted time reaches the preset period of time T1 at the point of time B).

When the output signal from the timer 11u changes from H level to L level at the point of time B, the short-circuit preventing timer 12u is triggered by the trailing edge and outputs a pulse signal with a pulse width corresponding to a short-circuit preventing period of time T2.

The flip-flop 13u is also triggered by the trailing edge of the output signal of the timer 11u and inverts the signal levels of its output signals (in the example of FIG. 9, the signal level of the output signal from the Q terminal is changed from L level to H level and the signal level of the output signal from the QB terminal is changed from H level to L level).

Further, since the signal level of the output signal from the QB terminal of the flip-flop 13u changes from H level to L level at the point of time B, the NAND circuit 17u is triggered by the trailing edge and changes the signal level of its output signal from L level to H level.

Thus, a signal at an H level is outputted from the terminal 19u on the negative phase side of the U-phase to the interface circuit 9 at the point of time B, and hence, the switching element 4, which has been in the conductive state from the time before the point of time A, is brought into the non-conductive state at the point of time B.

When the signal level of the pulse signal, which was outputted from the short-circuit preventing timer 12u at the point of time B, changes from H level to L level at the point of time C, the flip-flop 14u is triggered at its trailing edge and changes the signal level of its output signal from H level to L level.

Further, at the point of time C, the flip-flop 16u is also triggered by the trailing edge and changes the signal level of its output signal from L level to H level.

Then, when the signal level of the output signal from the flip-flop 14u is changed from H level to L level at the point of time C, the NAND circuit 15u is triggered by its trailing edge and changes the signal level of its output signal from H level to L level.

Thus, at the point of time C, a signal at an L level is outputted from the terminal 18u on the positive side of the U-phase to the interface circuit 9, and, hence, the switching element 3 which has been in the non-conductive state from the time before the point of time A is brought into the conductive state at the point of time C.

Thereafter, each time the timer 11u receives the control command for the switching elements 3 and 4 from the speed control circuit, not shown, the switching states of the switching elements 3 and 4 are controlled according to the same principle. At this time, as apparent from FIG. 9, both the switching element 3 and the switching element 4 are in the non-conductive state during the short-circuit preventing period of time T2, and, hence, the short-circuiting of the power supply (the state in which both the switching element 3 and the switching element 4 are rendered conductive at the same time), which is possible to occur when the switching states are switched over, can be prevented.

Since the prior art controller of power supplying apparatus was constructed as described above, the short-circuiting of the power supply possible to occur when the switching element 3 and the like are controlled can be prevented. However, since there is provided no means for suppressing a large transient current flowing from the power source 2 to the coil of the three-phase motor 1 through the switching element 3 and the like when the switching element 3 and the like in the non-conductive state is put into the conductive state, there have been such problems as increase of current consumed by the three-phase motor 1.

Incidentally, technologies to control the current flowing into the coil of a three-phase motor 1 by controlling the conducting period of time of the switching element 3 and the like are disclosed in gazettes of Japanese Patent Laid-open No. Hei 1-99493 and Japanese Patent Laid-open No. Hei 6-38539. In these gazettes, however, no disclosure is made as to the technology to suppress the transient current occurring when the switching element 3 and the like in the non-conductive state are put into the conductive state.

SUMMARY OF THE INVENTION

In view of the above described situation, the invention has as its object the provision of a controller of power supplying apparatus capable of suppressing transient currents flowing into the load when switching elements in the non-conductive state are put into the conductive state.

In order to achieve the above mentioned object, according to a first aspect of the invention, there is provided a controller of power supplying apparatus comprising command means for outputting a timing signal, when the switching means are to perform the switching operations, to command the switching operations to be started, short-circuit prevention means for outputting, upon outputting of the timing signal from the command means, a short-circuit preventing signal until a preset short-circuit preventing period of time elapses, and control means for bringing, upon outputting of the timing signal from the command means, one of the switching elements which is in the conductive state into the non-conductive state and, in the meantime, bringing the other switching element which is in the non-conductive state into an intermittently conductive state until the short-circuit prevention means stops the outputting of the short-circuit preventing signal and, thereafter, holding the switching element in the conductive state. Thus, such effects are obtained that the short-circuiting of the power supply can be prevented from occurring and, at the same time, the flow of a large transient current into the load, which is possible to occur when the switching element in the non-conductive state is brought into the conductive state, can be prevented and, hence, the current consumed by the load can be reduced.

According to a second aspect of the invention, there is provided the controller of power supplying apparatus in which the short-circuit prevention means has a logical circuit for outputting a signal with its signal level periodically inverting, as the short circuit preventing signal, until a preset short-circuit preventing period of time elapses, and the control means inverts the polarity of the switching element every time the signal level of the short-circuit preventing signal inverts. Thus, such an effect is obtained that the current consumed by the load can be reduced without making the configuration of the apparatus complicate.

According to a third aspect of the invention, there is provided the controller of power supplying apparatus further comprising selection means for selecting the inverting period of the short-circuit preventing signal outputted from the short-circuit prevention means. Thus, such an effect is obtained that the current flowing into the load when the switching element in the non-conductive state is brought into the conductive state can be regulated according to the specification of the load.

According to a fourth aspect of the invention, there is provided the controller of power supplying apparatus further comprising a timer for setting the inverting period of the short-circuit preventing signal outputted from the short-circuit prevention means. Thus, such an effect is obtained that the current flowing into the load when the switching element in the non-conductive state is brought into the conductive state can be finely regulated according to the specification of the load.

According to a fifth aspect of the invention, there is provided the controller of power supplying apparatus further comprising a pulse-width modulation timer for setting the duty cycle of the short-circuit preventing signal outputted from the short circuit prevention means. Thus, such an effect is obtained that the current flowing into the load can be more finely regulated.

According to a sixth aspect of the invention, there is provided the controller of power supplying apparatus further comprising setting means for setting the short-circuit preventing period of time. Thus, such an effect is obtained that the short-circuit preventing period of time can be set according to the specification of the load.

BRIEF DESCRIPTION OF THE DRAWINGS

Further objects and advantages of the invention will be more fully understood by reading the following detailed description with reference to the accompanying drawings.

DETAILED DESCRIPTION OF THE PREFERRED EMBODIMENTS

A preferred embodiment of the invention will be described in detail with reference to the accompanying drawings.

Embodiment 1.

Figure 1:
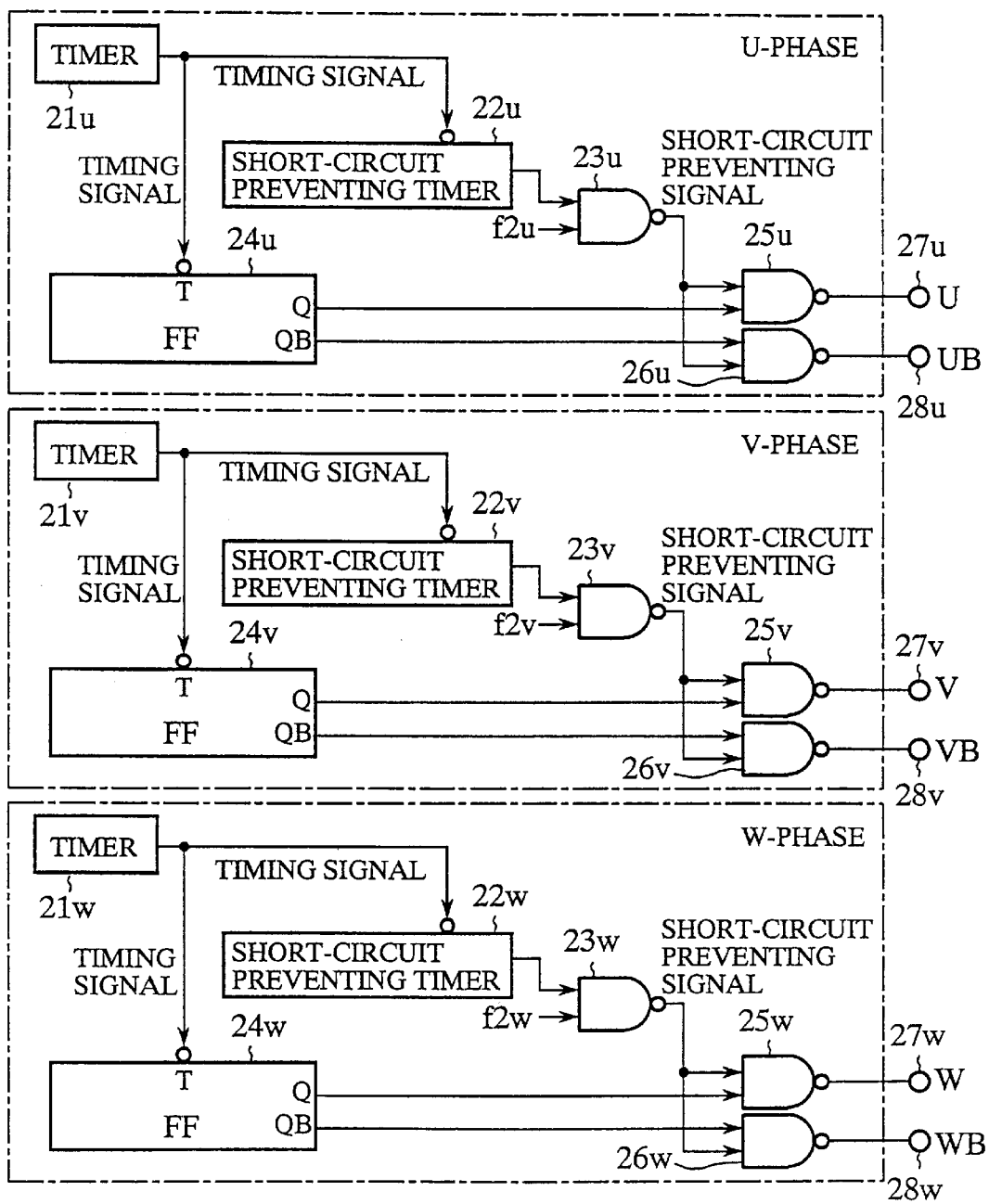
FIG. 1 is a block diagram showing structure of a controller of power supplying apparatus according to a first embodiment (Embodiment 1) of the invention.
Figure 7:
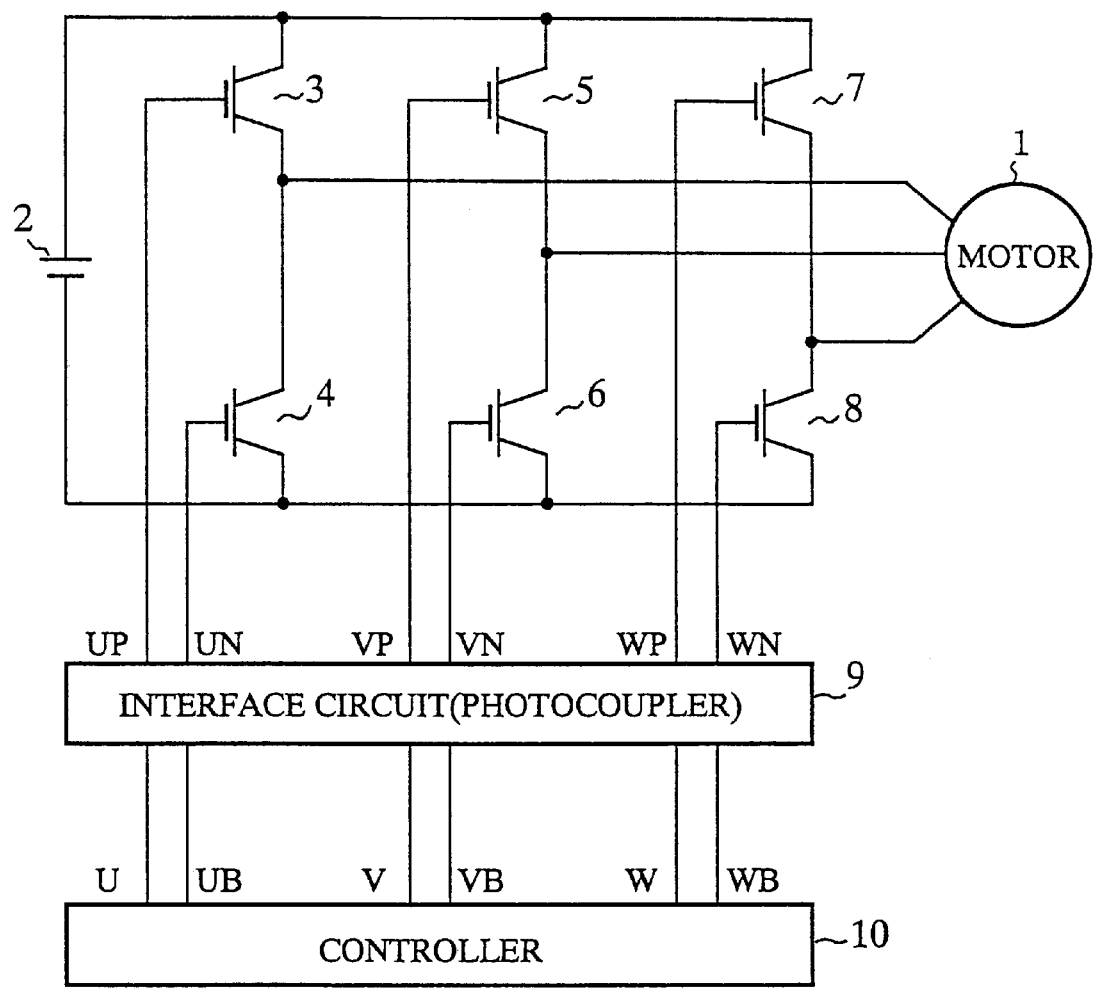
FIG. 7 is a circuit diagram showing the main circuit of a power supplying apparatus and the like controlled by a prior art controller of power supplying apparatus.
Figure 8:
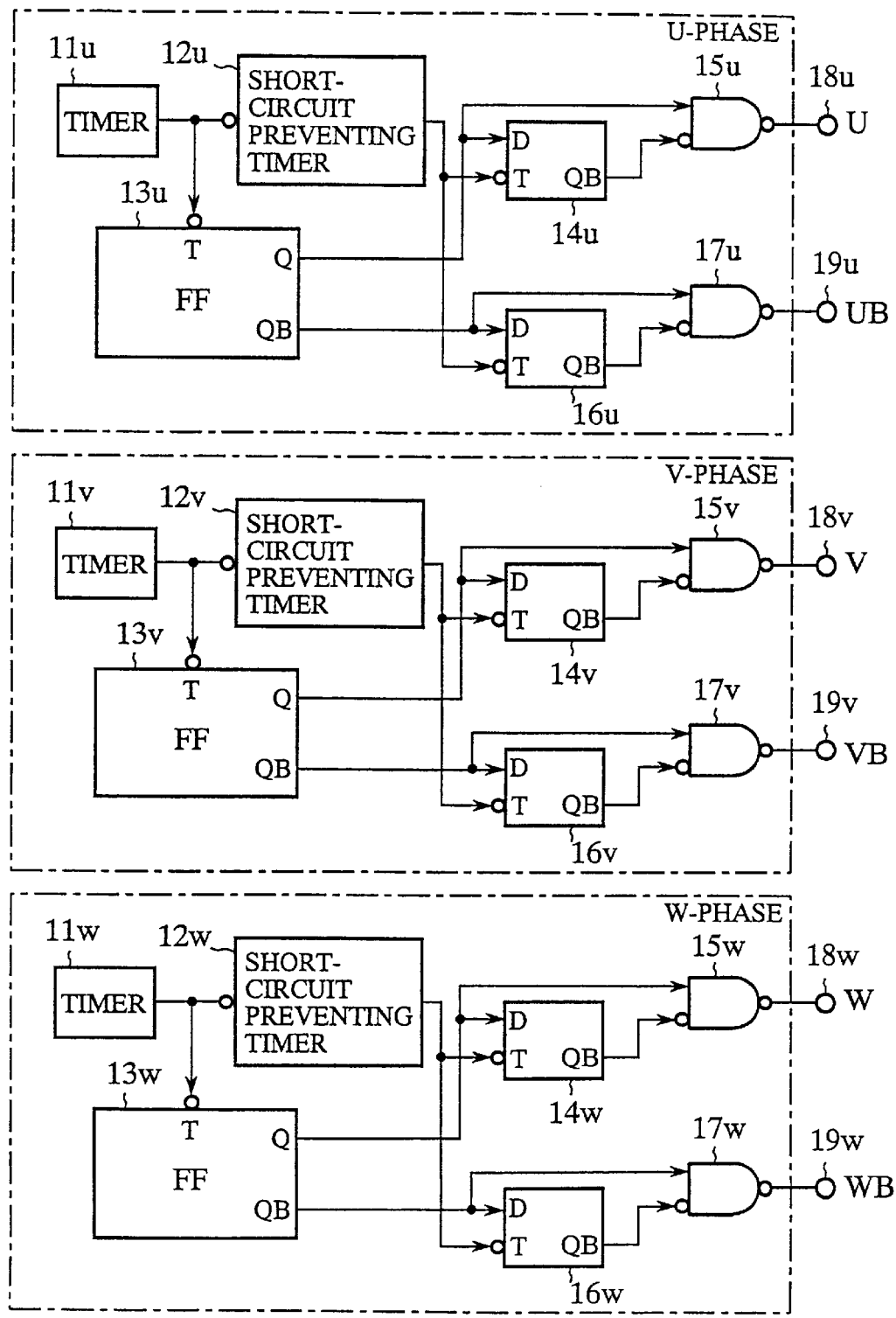
FIG. 8 is a block diagram showing structure of a prior art controller of power supplying apparatus.
Figure 9:
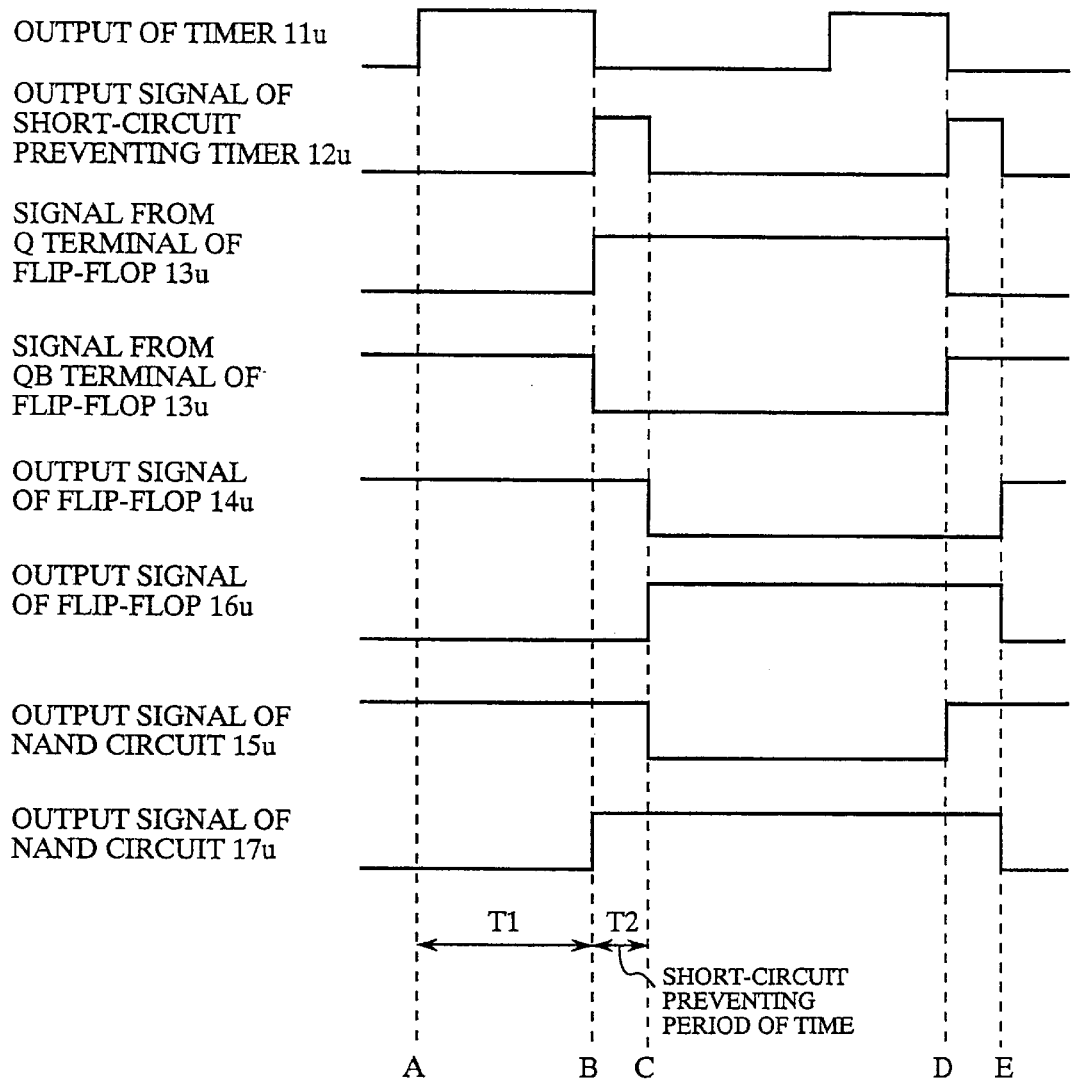
FIG. 9 is a waveform chart showing signal waveforms in various parts of the controller shown in FIG. 8.

FIG. 1 is a block diagram showing structure of a controller of power supplying apparatus according to the embodiment 1 of the invention. Since the main circuits of the power supplying apparatus and the like controlled by the controller shown in FIG. 1 are the same as those shown in FIG. 7, illustration and description of the same will be omitted.

Referring to FIG. 1, reference numerals $21u$, $21v$, and $21w$ denote timers (command means) outputting, upon receipt of control signals of the switching elements 3, 4, 5, 6, 7, and 8, respectively, a timing signal with a pulse width corresponding to a preset period of time T1. Reference numerals $22u$, $22v$, and $22w$ denote short-circuit preventing timers (short-circuit prevention means). The short-circuit preventing timers (short-circuit prevention means) $22u$, $22v$, and $22w$ output a pulse signal with a pulse width corresponding to a short-circuit preventing period of time T2 when the signal level of the signal outputted from the timers $21u$, $21v$, and $21w$ changes from H level to L level, respectively. Reference numerals $23u$, $23v$, and $23w$ denote NAND circuits (short-circuit prevention means). The NAND circuits (short-circuit prevention means) $23u$, $23v$, and $23w$ receive signals outputted from the short-circuit preventing timers $22u$, $22v$, and $22w$, respectively, at one input terminals thereof and receive a divided signal f2 obtained by dividing a clock signal by two as a short-circuit preventing signal at the other input terminals thereof. Reference numerals $24u$, $24v$, and $24w$ denote flip-flops (control means). The flip-flops (control means) $24u$, $24v$, and $24w$ invert the signal levels of their output signals when the signal level of the output signal from the timers $21u$, $21v$, and $21w$, respectively, changes from H level to L level.

Further, reference numerals $25u$, $25v$, and $25w$ denote NAND circuits (control means). The NAND circuits (control means) $25u$, $25v$, and $25w$ respectively receive the output signals of the NAND circuits $23u$, $23v$, and $23w$ at one input terminals thereof and receive the output signals from the Q terminals of the flip-flops $24u$, $24v$, and $24w$ at the other input terminals. Reference numerals $26u$, $26v$, and $26w$ denote NAND circuits (control means). The NAND circuits (control means) $26u$, $26v$, and $26w$ respectively receive the output signals of the NAND circuits $23u$, $23v$, and $23w$ at one input terminals thereof and receive the output signals from the QB terminals of the flip-flops $24u$, $24v$, and $24w$ at the other input terminals. Reference numerals $27u$, $27v$, and $27w$ denote the terminals on the positive phase side of the U-phase, V-phase, and W-phase, respectively. Reference numerals $28u$, $28v$, and $28w$ denote the terminals on the negative phase side of the U-phase, V-phase, and W-Phase, respectively.

Now, operations will be described. Operations of the V-phase and W-phase of the controller of the embodiment 1 are the same as operations of the U-phase, the operations of the U-phase will only be described and description of the operations of the V-phase and W-phase will be omitted.

Figure 2:
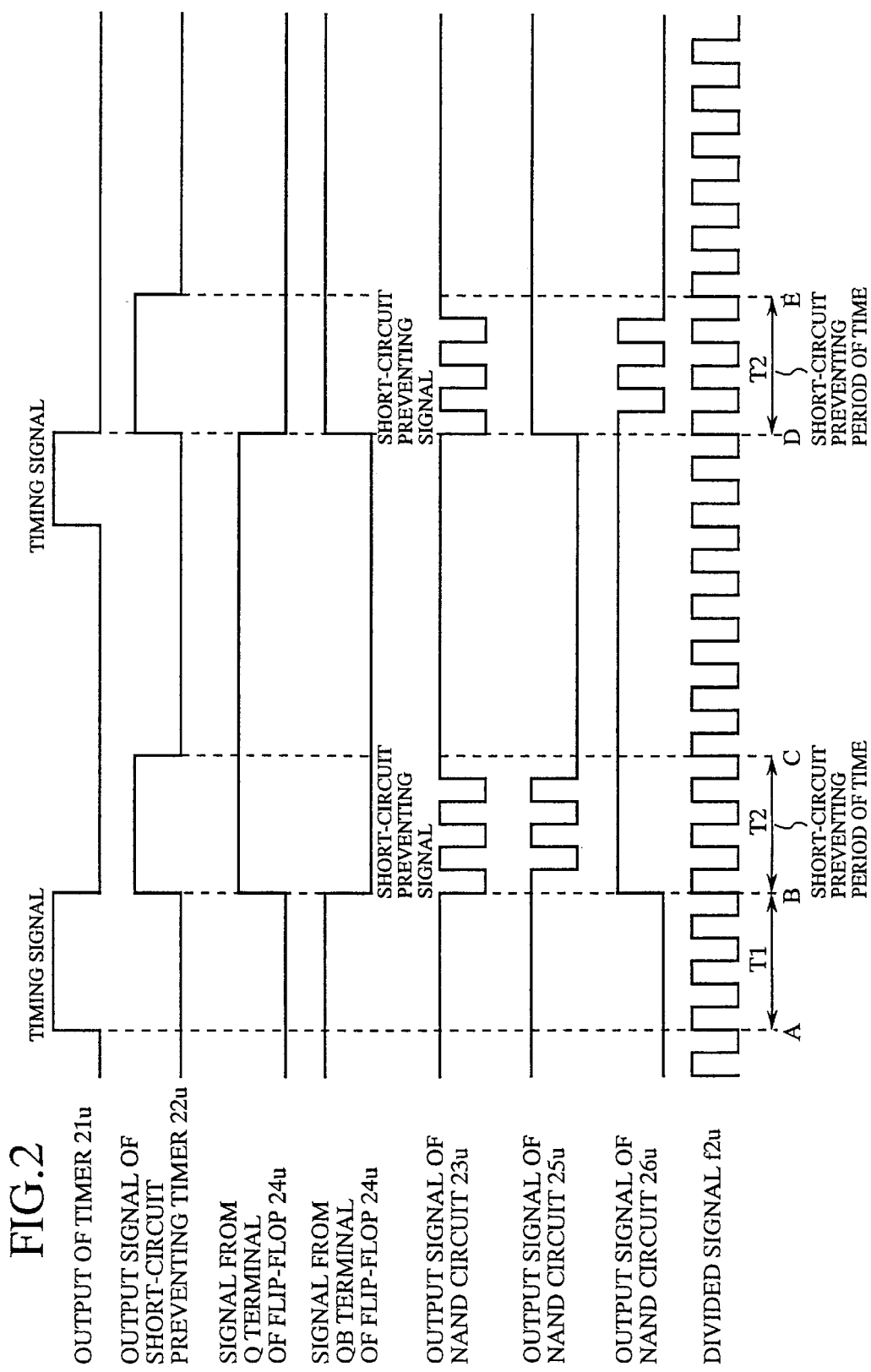
FIG. 2 is a waveform chart showing signal waveforms in various parts of the controller shown in FIG. 1.

First, the timer $21u$, upon receipt of a command signal for the switching elements 3 and 4 from a speed control circuit, not shown, at the point of time A as shown in FIG. 2, outputs a timing signal with a pulse width corresponding to a preset period of time T1.

Then at the point of time B, when the output signal of the timer $21u$ changes from H level to L level, the short-circuit preventing timer $22u$ is triggered by the trailing edge and outputs a pulse signal with a pulse width corresponding to a short-circuit preventing period of time T2.

The flip-flop $24u$ is also triggered by the trailing edge and inverts the signal levels of its output signals (in the example of FIG. 2, the signal level of the signal outputted from the Q terminal is changed from L level to H level and the signal level of the signal outputted from the QB terminal is changed from H level to L level).

Further, since the signal level of the signal outputted from the QB terminal of the flip-flop $24u$ is changed from H level to L level at the point of time B, the NAND circuit $26u$ is triggered by the trailing edge and changes the signal level of its output signal from L level to H level.

Since the signal at the H level is outputted from the terminal on the negative phase side of the U-phase $28u$ to the interface circuit 9 at the point of time B, the switching element 4 which has been in the conductive state from the time before the point of time A is put into the non-conductive state at the point of time B.

Further, upon outputting of the pulse signal from the short-circuit preventing timer $22u$ at the point of time B, the NAND circuit $23u$ outputs an inverted signal f2 of the divided signal obtained by dividing the clock signal by two as a short-circuit preventing signal until the point of time C, at which the pulse signal outputted from the short-circuit preventing timer 22u falls, and, thereafter, it outputs a signal at an H level.

Further, since the signal level of the signal outputted from the Q terminal of the flip-flop 24u changes from L level to H level at the point of time B, the NAND circuit 25u inverts the signal outputted from the NAND circuit 23u and outputs this inverted signal.

Thus, signals at an H level and signals at an L level are alternately outputted from the terminal on the positive side of the U-phase 27u to the interface circuit 9 during the period from the point of time B to the point of time C and, after the point of time C, a signal at an L level is continuously outputted from the terminal on the positive side of the U-phase 27u to the interface circuit 9, and therefore, the switching element 3 which has been in the non-conductive state before the point of time A is put into an intermittently conductive state during the period from the point of time B to the point of time C and, after the point of time C, it holds the conductive state.

Thereafter, every time the timer 21u receives the command signal for the switching elements 3 and 4 from the speed controlling circuit, not shown, the switching states of the switching elements 3 and 4 are controlled according to the same principle. At this time, since, as apparent from FIG. 2, the switching element 4 is held in the non-conductive state during the short-circuit preventing period of time T2 from the point of time B to the point of time C, the short-circuiting of the power supply (the state in which both the switching element 3 and the switching element 4 are rendered conductive at the same time), which is possible to occur when switching states are changed over, can be prevented from occurring. Meanwhile, since the switching element 3 is intermittently rendered conductive during the short-circuit preventing period of time T2 from the point of time B to the point of time C, current from the power supply 2 gently flows into the three-phase motor 1 through the switching element 3. Accordingly, even if the switching element 3 is brought into the conductive state at the point of time C, a large transient current does not flow into the coil of the three-phase motor 1.

As apparent from the above, it is adapted in the embodiment 1 such that the switching element 4 in the conductive state is brought into the non-conductive state when the timing signal is outputted from the timer 21u and, in the meantime, the switching element 3 in the non-conductive state is brought into the intermittently conductive state until the NAND circuit 23u stops the outputting of the short-circuit preventing signal and, thereafter, the switching element 3 is held in the conductive state. Thus, such effects are obtained that the short-circuiting of the power supply can be prevented from occurring and, at the same time, the flow of a large transient current into the coil of the three-phase motor 1, which is possible to occur when the switching element 3 in the non-conductive state is brought into the conductive state, can be prevented and, hence, the current consumed by the three-phase motor 1 can be reduced.

EMBODIMENT 2.

Figure 3:
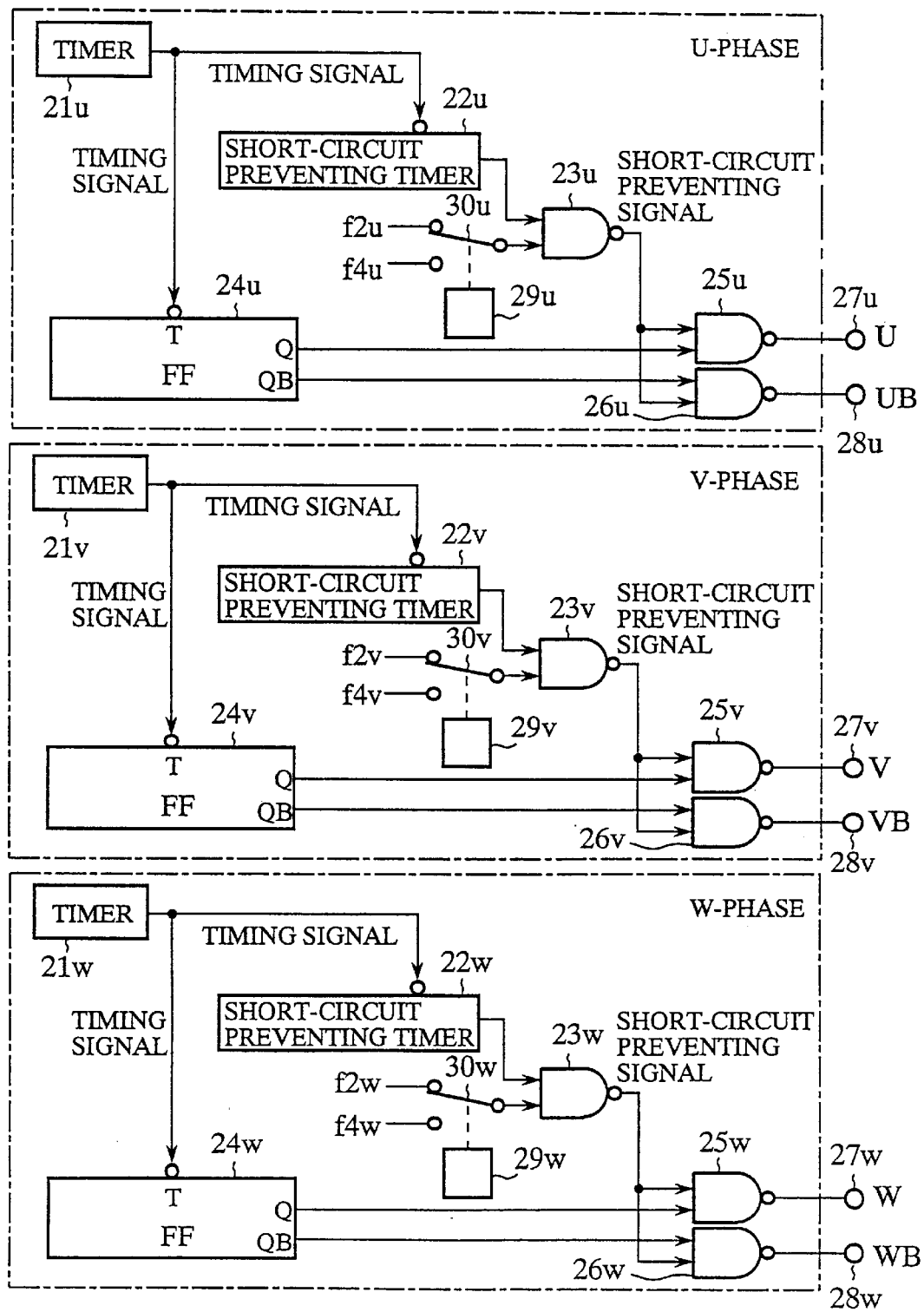
FIG. 3 is a block diagram showing structure of a controller of power supplying apparatus according to a second embodiment (Embodiment 2) of the invention.

Although, in the above embodiment 1, a configuration in which the divided signal f2 was inputted at all times to the NAND circuits 23u, 23v, and 23w was shown, it may also be possible to provide switches 30u, 30v, and 30w (selection means) for selecting either the divided signal f2 obtained by dividing the clock signal by two or a divided signal f4 obtained by dividing the clock signal by four, according to the value stored in a selection bit 29 as shown in FIG. 3.

Thus, such an effect is obtained that the current flowing into the coil of a three-phase motor 1 when the switching element in the non-conductive state is put into the conductive state can be regulated according to the specification of the three-phase motor 1.

EMBODIMENT 3.

Figure 4:
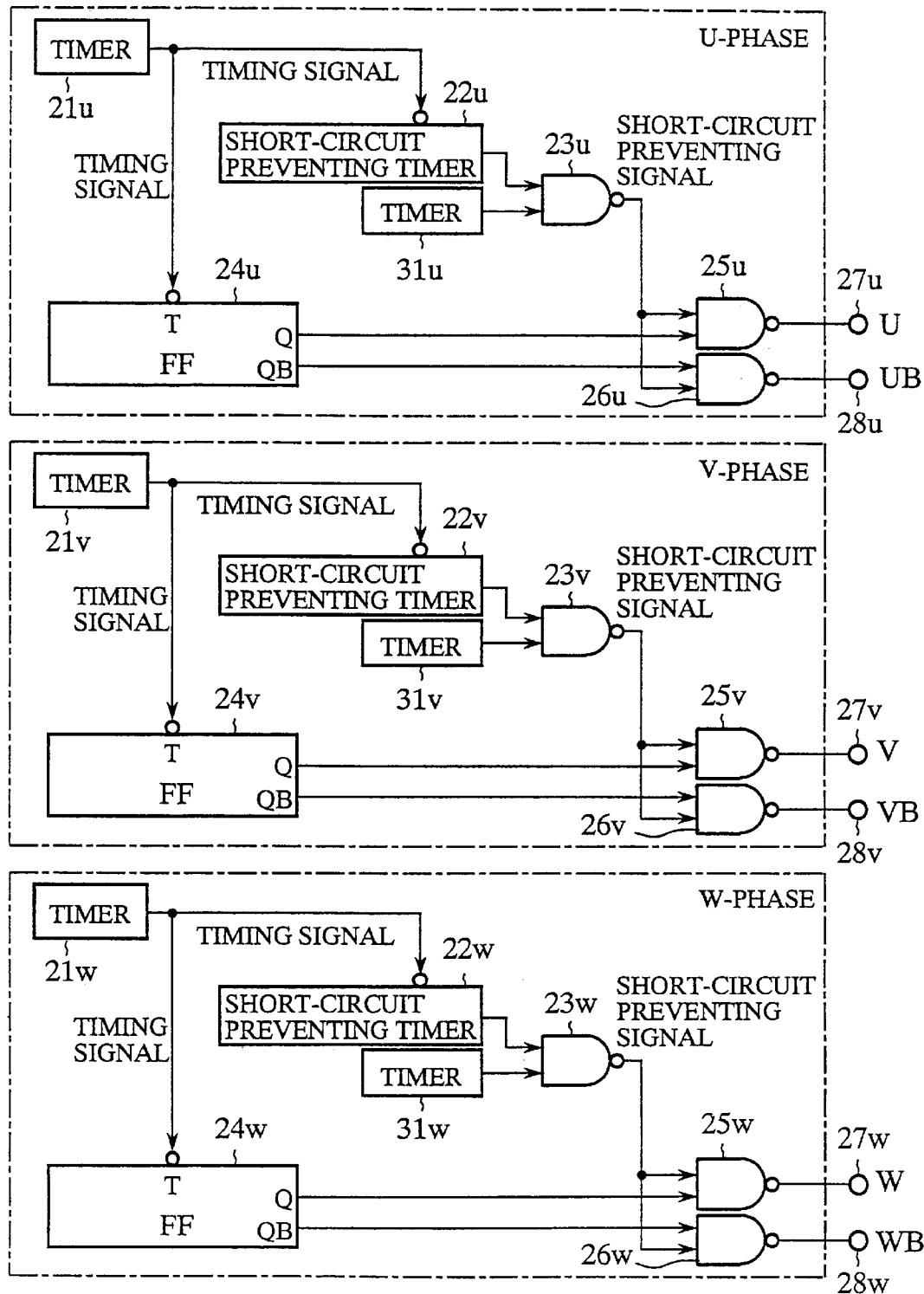
FIG. 4 is a block diagram showing structure of a controller of power supplying apparatus according to a third embodiment (Embodiment 3) of the invention.

Although, in the above described embodiment 2, an example in which switches 30u, 30v, and 30w were used for selecting one from two divided signals was shown, it may be adapted such that the inversion period of the short-circuit preventing signal outputted from the NAND circuits 23u, 23v, and 23w is set by means of timers 31u, 31v, and 31w as shown in FIG. 4.

Thus, such an effect is obtained that the current flowing into the coil of a three-phase motor 1 when the switching element in the non-conductive state is brought into the conductive state can be finely regulated according to the specification of the three-phase motor 1.

EMBODIMENT 4.

Figure 5:
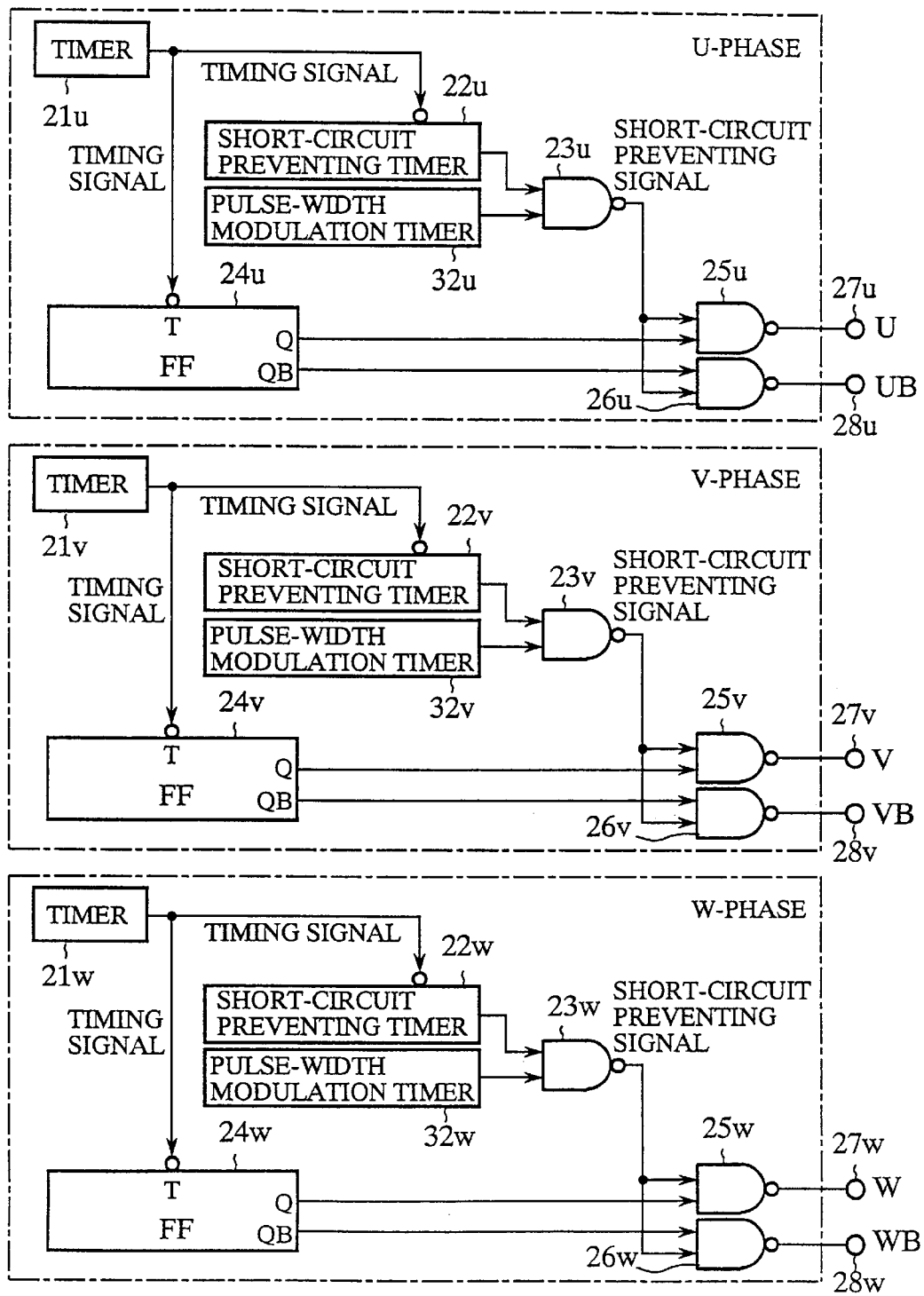
FIG. 5 is a block diagram showing structure of a controller of power supplying apparatus according to a fourth embodiment (Embodiment 4) of the invention.

Although, in the above described embodiment 3, an example in which timers 31u, 31v, and 31w were used for setting the inversion period of the short-circuit preventing signal outputted from the NAND circuits 23u, 23v, and 23w was shown, it may also be adapted such that the duty cycle of the short-circuit preventing signal outputted from the NAND circuits 23u, 23v, and 23w is set by means of pulse-width modulation timers 32u, 32v, and 32w as shown in FIG. 5.

Thus, such an effect is obtained that the current flowing into the coil of a three-phase motor 1 can be more finely regulated than in the embodiment 3.

EMBODIMENT 5.

Figure 6:
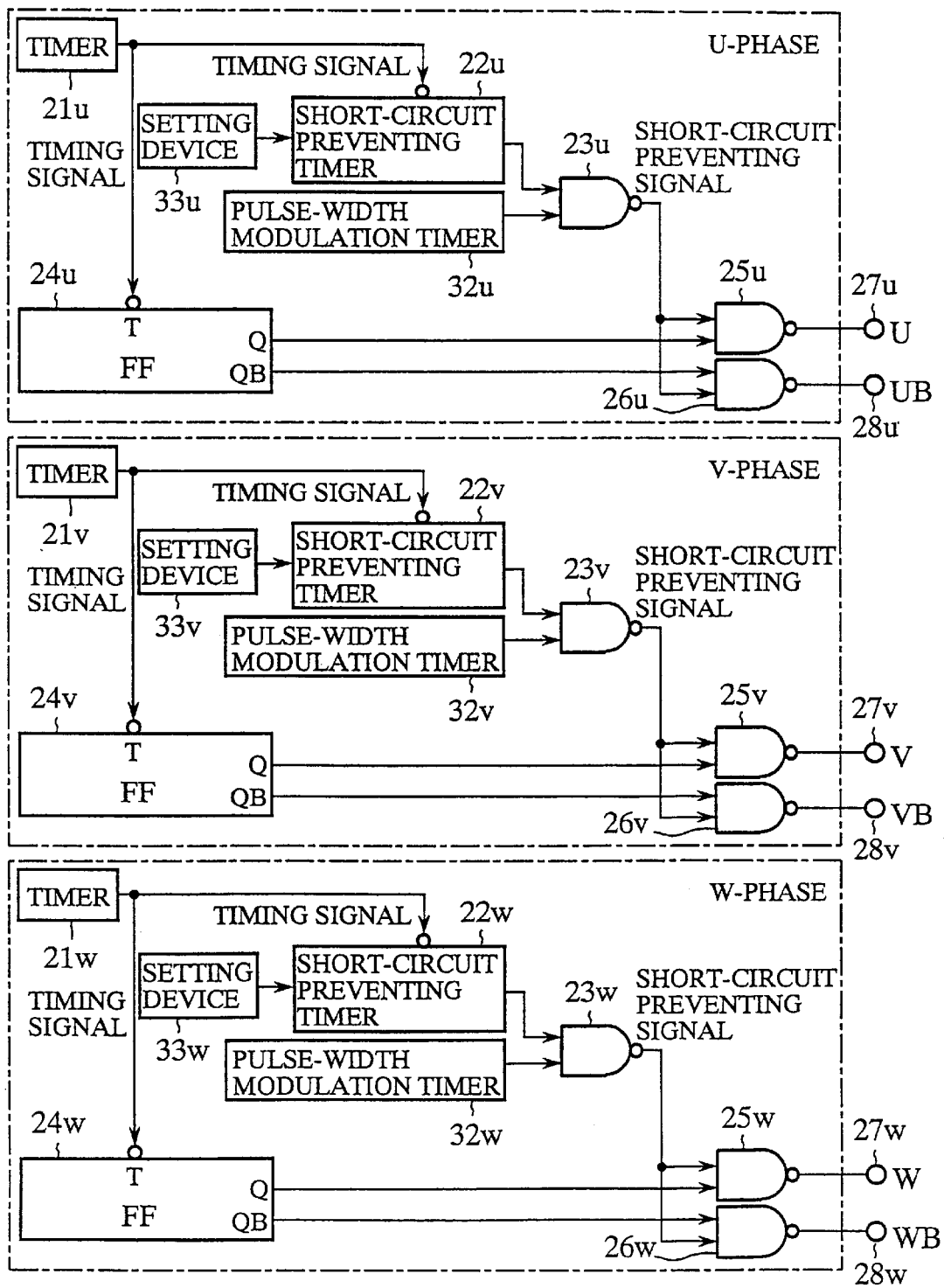
FIG. 6 is a block diagram showing structure of a controller of power supplying apparatus according to a fifth embodiment (Embodiment 5) of the invention.

Although, in the above described embodiment 1 to embodiment 4, a type in which a preset short-circuit preventing period of time T2 was invariably used was shown, setting devices (setting means) 33u, 33v, and 33w for setting the short-circuit preventing period of time T2 may be provided as shown in FIG. 6 to allow the short-circuit preventing period of time T2 to be changed according to necessity.

Thus, such an effect is obtained that the short-circuit preventing period of time T2 can be set according to the specification of a three-phase motor 1.

Although, in all of the above described embodiments, the load was described to be a three-phase motor, the controller of the invention is applicable, regardless of the type of the load, as long as it is used for controlling a power supplying apparatus for supplying power to the load by having switching elements connected in series with the power supply alternately perform switching operations.

The description of the preferred embodiments of the invention given above is for illustrative purpose only and it is to be understood that modifications and changes from what were described above may be made without departing from the spirit and the scope of the following claims.

What is claimed is:

1. A controller of power supplying apparatus for controlling a power supplying apparatus which supplies power to a load by having switching elements connected in series with the power supply alternately perform switching operations comprising:

command means for outputting a timing signal, when said switching means are to perform the switching operations, to command the switching operations to be started;

short-circuit prevention means for outputting, upon outputting of the timing signal from said command means, a short-circuit preventing signal until a preset short-circuit preventing period of time elapses; and control means for bringing, upon outputting of the timing signal from said command means, one of said switching elements which is in the conductive state into the non-conductive state and, in the meantime, bringing the other switching element which is in the non-conductive state into an intermittently conductive state until said short-circuit prevention means stops the outputting of the short-circuit preventing signal and, thereafter, holding the switching element in the conductive state.

2. A controller of power supplying apparatus according to claim 1, wherein said short-circuit prevention means has a logical circuit for outputting a signal with its signal level periodically inverting, as the short circuit preventing signal, until a preset short-circuit preventing period of time elapses, and said control means inverts the polarity of the switching element every time the signal level of said short-circuit preventing signal inverts.

3. A controller of power supplying apparatus according to claim 2, further comprising:

selection means for selecting the inverting period of the short-circuit preventing signal outputted from said short-circuit prevention means.

4. A controller of power supplying apparatus according to claim 2, further comprising:

a timer for setting the inverting period of the short-circuit preventing signal outputted from said short-circuit prevention means.

5. A controller of power supplying apparatus according to claim 2, further comprising:

a pulse-width modulation timer for setting the duty cycle of the short-circuit preventing signal outputted from said short circuit prevention means.

6. A controller of power supplying apparatus according to claim 1, further comprising:

setting means for setting the short-circuit preventing period of time.

* * * * *